(12) United States Patent
Horie

(10) Patent No.: US 9,497,947 B2
(45) Date of Patent: Nov. 22, 2016

(54) FISHING SPINNING REEL

(71) Applicant: Globeride, Inc., Tokyo (JP)

(72) Inventor: Hironori Horie, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/768,035

(22) PCT Filed: Feb. 6, 2014

(86) PCT No.: PCT/JP2014/052759
§ 371 (c)(1),
(2) Date: Aug. 14, 2015

(87) PCT Pub. No.: WO2014/132768
PCT Pub. Date: Sep. 4, 2014

(65) Prior Publication Data
US 2015/0373961 A1 Dec. 31, 2015

(30) Foreign Application Priority Data
Feb. 28, 2013 (JP) .................................. 2013-039457

(51) Int. Cl.
*A01K 89/01* (2006.01)

(52) U.S. Cl.
CPC ......... *A01K 89/01085* (2015.05); *A01K 89/01* (2013.01); *A01K 89/0108* (2013.01); *A01K 89/011221* (2015.05)

(58) Field of Classification Search
CPC ........... A01K 89/01; A01K 89/01081; A01K 89/01082; A01K 89/011221
See application file for complete search history.

(56) References Cited

U.S. PATENT DOCUMENTS

| 6,209,816 | B1 * | 4/2001 | Hitomi | A01K 89/01 242/310 |
| 6,343,418 | B1 * | 2/2002 | Hitomi | A01K 89/01 164/98 |
| 2004/0206840 | A1 * | 10/2004 | Kitajima | A01K 89/01 242/306 |

(Continued)

FOREIGN PATENT DOCUMENTS

| EP | 2 363 021 | 9/2011 |
| JP | H06-33467 | 5/1994 |

(Continued)

OTHER PUBLICATIONS

International Search Report for Appln. No. PCT/JP2014/052759.

(Continued)

*Primary Examiner* — Emmanuel M Marcelo
(74) *Attorney, Agent, or Firm* — Pillsbury Winthrop Shaw Pittman, LLP

(57) ABSTRACT

Provided is a fishing spinning reel in which biting or entanglement of a fishing line in components disposed inside a rotor can be prevented and with which a fine fishing operability can be provided. A fishing spinning reel includes a reel body 1, a rotor 3 rotated in accordance with a rotational operation of a handle 5 provided on the reel body 1, a spool 4 around which a fishing line is wound through a line guide 35 provided on an arm portion 32 of the rotor 3, a cylindrical protection cover 20 disposed on a front portion of the reel body 1 inside the rotor 3 to house components disposed inside the rotor 3, and a fishing line stopper protruding out from an outer periphery of the protection cover 20 in a radial direction.

10 Claims, 10 Drawing Sheets

(56) References Cited

U.S. PATENT DOCUMENTS

| | | | |
|---|---|---|---|
| 2008/0191079 A1* | 8/2008 | Sugahara | A01K 89/01 242/230 |
| 2010/0327097 A1 | 12/2010 | Fujioka et al. | |
| 2011/0042500 A1* | 2/2011 | Saito | A01K 89/01 242/224 |
| 2011/0174909 A1* | 7/2011 | Shibata | A01K 89/01 242/230 |
| 2011/0233316 A1* | 9/2011 | Chan | A01K 89/01 242/224 |
| 2012/0097779 A1* | 4/2012 | Inoue | A01K 89/01 242/249 |
| 2013/0206889 A1* | 8/2013 | Ochiai | A01K 89/00 242/322 |
| 2014/0027555 A1* | 1/2014 | Takamatsu | A01K 89/01 242/283 |
| 2014/0263791 A1* | 9/2014 | Sabtu | A01K 89/01 242/224 |

FOREIGN PATENT DOCUMENTS

| | | |
|---|---|---|
| JP | 2002-369643 | 12/2002 |
| JP | 2004-267199 | 9/2004 |
| JP | 2012-29650 | 2/2012 |
| JP | 4939573 | 5/2012 |

OTHER PUBLICATIONS

Chinese Office Action dated Jul. 7, 2016 for Appln. No. 201480010222.X.

Extended European Search Report dated Apr. 25, 2016 for Appln. No. 14756604.6.

* cited by examiner

FISHING SPINNING REEL

CROSS REFERENCE TO RELATED APPLICATIONS

This application is the U.S. National Stage of PCT/JP2014/052759, filed Feb. 6, 2014, which in turn claims priority to Japanese Patent Application Serial No. 2013-039457, filed on Feb. 28, 2013, the entire contents of all applications are incorporated herein by reference in their entireties.

TECHNICAL FIELD

The present invention relates to a fishing spinning reel.

BACKGROUND

Generally, a fishing spinning reel includes a rotor and a spool on which the fishing line is wound around. The rotor includes an arm portion having a bail support member on which a line roller is provided for guiding a fishing line, and a cylinder portion to which the arm portion is coupled.

During releasing or winding operation of a fishing line on a fishing spinning reel, the winding of the fishing line could loosen and the fishing line could be disengaged, or a winding position of the fishing line could be shifted backward due to line slack caused by tension changes and effects of wind. More specifically, the disengaged fishing line could enter inside the rotor and the fishing line could be entangled or bite into components disposed inside the rotor. If such a thing happens, fishing operability of the reel will be lost.

Meanwhile, in order to reduce the weight of a fishing spinning reel, it has been known that an arm portion and a cylinder portion of a rotor may have one or more openings (see Patent Documents 1 and 2).

RELEVANT REFERENCES

List of Relevant Patent Literature

Patent Document 1: Japanese Patent No. 4939573
Patent Document 2: Japanese Patent Application Publication No. 2012-29650

SUMMARY

According to the fishing spinning reels disclosed in Patent Documents 1 and 2, it is possible to reduce the weight of the rotor. However, due to a large opening formed in the rotor, a gap between a front portion of a reel body and the rotor tends to be increased. In this case, there is a risk for the fishing line entering inside the rotor through the gap.

The present disclosure is intended to overcome the above problem, and one object thereof is to provide a fishing spinning reel in which biting or entanglement of a fishing line in components disposed inside a rotor can be prevented and with which a fine fishing operability can be provided.

To this end, a fishing spinning reel includes a reel body, a rotor rotated in accordance with a rotational operation of a handle provided on the reel body, a spool around which a fishing line is wound through a line guide provided on an arm portion of the rotor, a cylindrical protection cover disposed on a front portion of the reel body inside the rotor to house components disposed inside the rotor, and a fishing line stopper protruding out from an outer periphery of the protection cover in a radial direction.

According to this fishing spinning reel, even if the fishing line enters between the front portion of the reel body and the rotor, the fishing line stopper can stop the fishing line on the protection cover and prevent the fishing line from moving further than the stopper toward the front side.

Moreover, the fishing line stopper may be provided on a front portion of the protection cover.

According to this fishing spinning reel, it is possible to securely prevent the fishing line from moving further than the fishing line stopper toward the front side.

Furthermore, the protection cover may include a base portion and a lid portion attached on a front end of the base portion, and the fishing line stopper is provided on the lid portion.

According to this fishing spinning reel, the fishing line stopper can be easily provided on the protection cover by attaching the lid portion to the base portion.

Moreover, the base portion may be integrally formed with the reel body.

According to this fishing spinning reel, the fishing line stopper can be easily provided on the protection cover by attaching the lid portion to the base portion integrally formed with the reel body.

Moreover, the fishing line stopper may be provided on a rear portion of the protection cover.

According to this fishing spinning reel, it is possible to stop the fishing line around the entrance of an opening between the reel body and the rotor.

According to the fishing spinning reel described in the above embodiment, the fishing line stopper can stop a fishing line on the protection cover and therefore it is possible to prevent the fishing line from moving further than the fishing line stopper toward the front side. Consequently, it is possible to prevent the fishing line from biting or entangling in components disposed inside the rotor. In this manner, a fishing spinning reel with a fine fishing operability can be obtained.

Moreover, since the fishing line stopper is provided on the front portion of the protection cover, it is possible to securely prevent the fishing line from moving further than the fishing line stopper toward the front side. Consequently, it is possible to adequately prevent the fishing line from biting or entangling in components disposed inside the rotor.

Moreover, when the protection cover includes the base portion and the lid portion and the fishing line stopper can be easily provided on the protection cover by attaching the lid portion to the base portion, it is possible to improve the productivity of the spinning reel.

Moreover when the base portion of the protection cover is integrally formed with the reel body, the fishing line stopper can be easily provided on the reel body by attaching the lid portion to the base portion integrally formed with the reel body, and therefore it is possible to reduce the cost and to improve the productivity of the spinning reel.

Moreover when the fishing line stopper is provided on the rear portion of the protection cover, it is possible to stop a fishing line around the entrance of the opening between the rotor and the reel body. Therefore, the fishing line will not enter through the opening between the reel body and the rotor and it is possible to securely prevent the fishing line from biting or entangling in components disposed inside the rotor.

BRIEF DESCRIPTION OF THE DRAWINGS

FIG. 2b is a schematic sectional view along the A-A line in FIG. 2a.

DESCRIPTION OF THE PREFERRED EMBODIMENTS

Embodiments of a fishing spinning reel according to the present disclosure will be now described with reference to the drawings. Across the embodiments, the same elements are denoted with the same numeral; and duplicate description will be omitted. In the following description, the directions referred to as "front and rear (back and forth)" and "top and bottom" are based on those shown in FIG. 1.

First Embodiment

Figure 1:
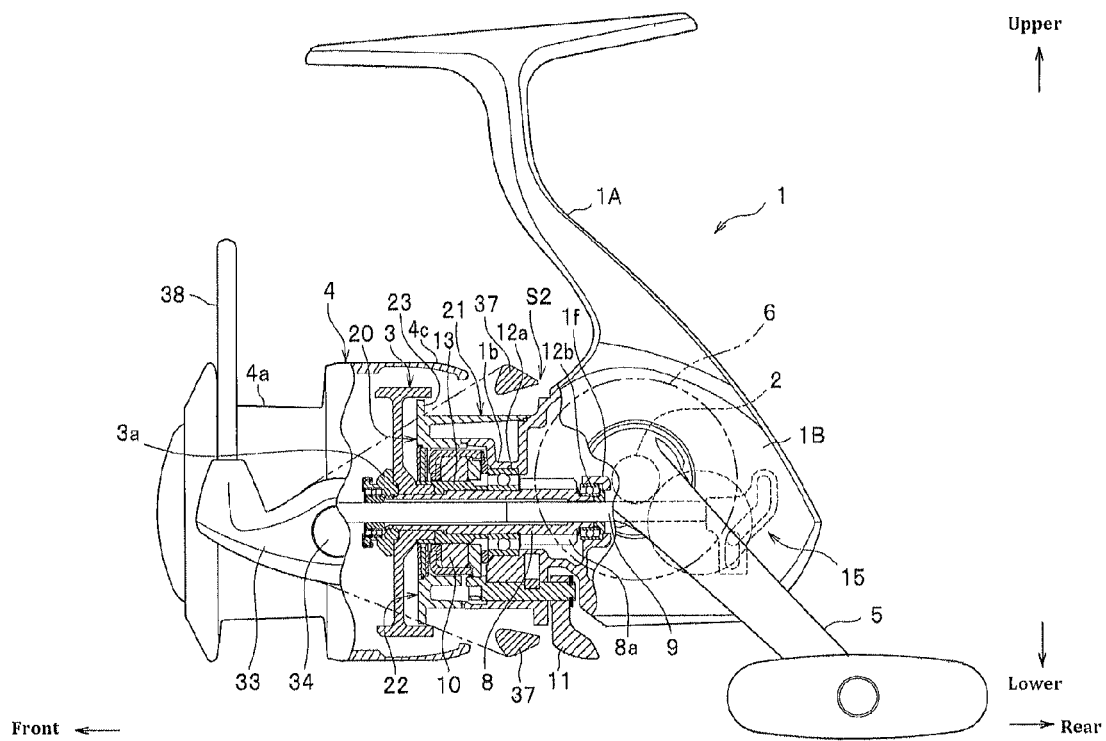
FIG. 1 shows the entirety of a fishing spinning reel according to a first embodiment of the present disclosure.

Referring to FIG. 1, a fishing spinning reel may include a reel body 1 (made of, for instance, metal) having a leg 1A for attaching the reel to a fishing rod (not shown), a rotor 3 rotatably disposed in front of the reel body 1, and a spool 4 provided so as to be movable back and forth in synchronization with the rotation of the rotor 3. An opening formed on a side of the real body 1 may be closed with a cap member 1B and a cylindrical protection cover 20 is attached on a front portion of the real body 1 inside the rotor 3.

Moreover, on the reel body 1, a handle shaft 2 may be rotatably supported through a bearing (not shown) and a handle 5 used for winding operation is attached to an end of a projecting end (not shown) of the handle shaft 2. A shaft sleeve (not shown) may be unrotatably fixed onto the handle shaft 2. A drive gear 6 having internal teeth for wind-driving of the rotor 3 may be integrally formed with the shaft sleeve. The drive gear 6 is meshed with a pinion gear 8a of a rotational shaft sleeve 8 that extends in a direction perpendicular to the handle shaft 2 and has a cavity extending in an axial direction thereinside.

The rotational shaft sleeve 8 may be rotatably supported by the reel body 1 through bearings 12a, 12b provided on front and rear sides of the pinion gear 8a respectively. Moreover, the rotational shaft sleeve 8 extends towards the spool 4 and the rotor 3 is attached to the tip end of the rotational shaft sleeve 8 through a rotor nut 3a. The bearing 12a located on the front side of the pinion gear 8a is supported at its rear end that contacts with a front end of the pinion gear 8a and a concave-supporting portion 1b formed in the center of the front portion of the reel body 1. A front end of the bearing 12a may be retained in the axial direction by an inner ring 13 of a rolling type one-way clutch 10 so as not to come off. The bearing 12b located in the rear of the pinion gear 8a may be axially fixed by being fitted between the rear end of the pinion gear 8a and a supporting portion 1f formed in the reel body 1.

The one-way clutch 10 works as a well-known anti-reverse device (stopper) to prevent backlash of the handle 5 (the rotor 3) in the fishing line releasing direction. The one-way clutch 10 may be interlocked with a switching member 11 provided under the reel body 1 and the one-way clutch 10 is switched between an operating state and a non-operating state when the switching member 11 is rotatably operated. In this case, the backlash (rotation in the fishing line releasing direction) of the handle 5 (rotor 3) is prevented by switching the switching member 11 to the operating state. Outer periphery of the one-way clutch 10 is surrounded and protected by the protection cover 20.

A cavity may be provided inside the rotational shaft sleeve 8 and a spool shaft 9 is inserted and supported therein with a clearance in which the spool shaft 9 is allowed to slide. Moreover, a well-known spool reciprocation device 15 is coupled to a rear end of the spool shaft 9 in order to allow a spool 4 (the spool shaft 9) to reciprocate back and forth.

Figure 2A:
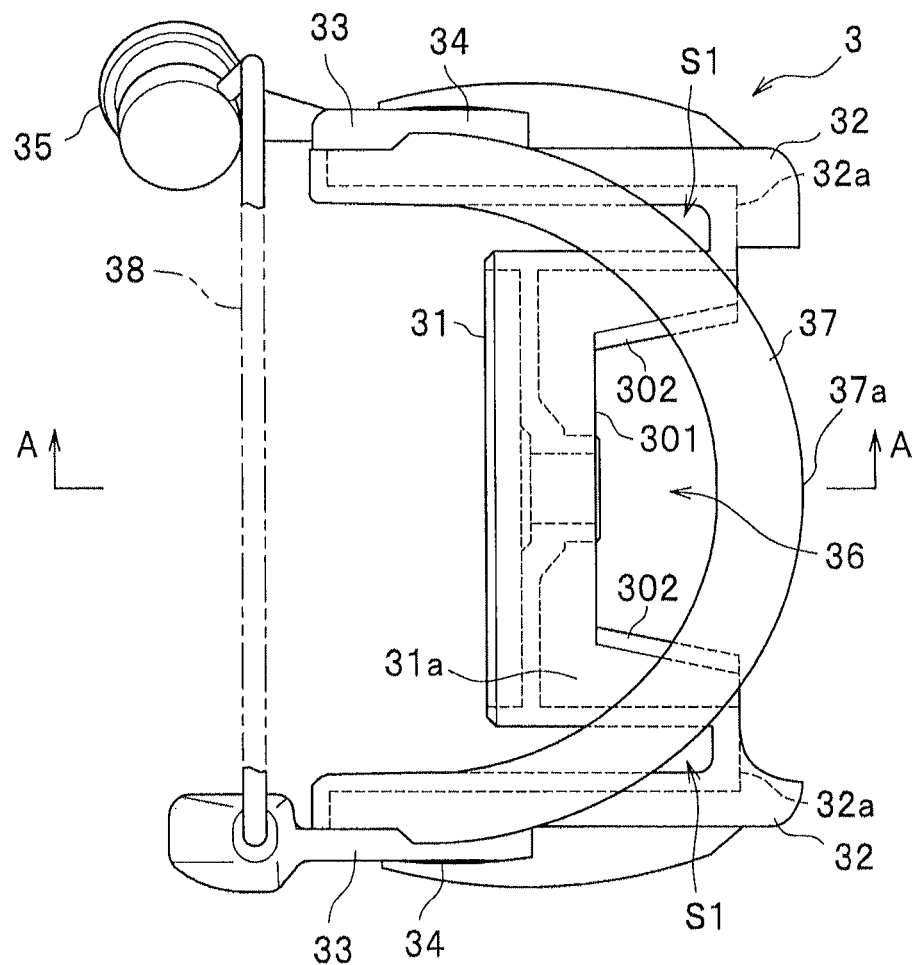
FIG. 2a is a side view of a rotor.

In the fishing spinning reel with the above-described configurations, when the winding operation is performed with the handle 5, the spool 4 moves back and forth by the spool reciprocation device 15 as the rotor 3 is rotated by the winding operation device. Thus, the fishing line can be uniformly reeled in a winding body 4a of the spool 4 via a line guide 35 of the rotor 3 (see. FIG. 2a).

Referring to FIG. 2a, the rotor 3 may have a cylinder portion 31 formed in a substantially cylindrical shape and a pair of arm portions 32 disposed at an angle of substantially 180 degree on the periphery of the cylinder portion. Each arm portion 32 may be integrally formed with the cylinder portion 31 though a connecting portion 32a extruding radially out from a rear portion (the side closer to the reel body 1) of the cylinder portion 31. Each arm portion 32 extends axially from the connecting portion 32a. Accordingly, a clearance S1 is formed between the cylinder portion 31 and each arm portion 32, and a skirt portion 4c (see FIG. 1) of the spool 4 is located in this clearance.

Figure 2B:
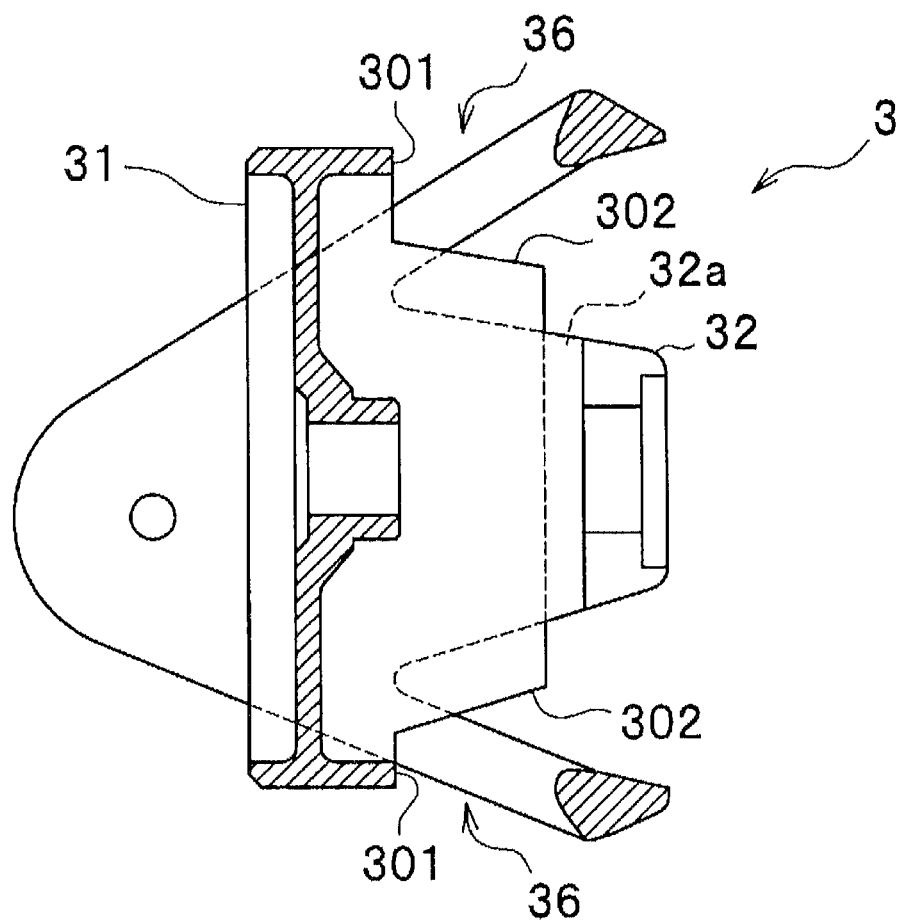

Referring to FIG. 2, at ends of the pair of arm portions 32, a supporting member 33 may be supported respectively such that the supporting member 33 is able to turn over about a support shaft 34 between a fishing line winding position and a fishing line releasing position. A line roller (fish line guide) 35 may be provided at a tip of one of the supporting members 33. Between the supporting members 33, provided is a bail 38 that picks up a fishing line and guides it to the line guide 35 when the supporting members 33 return to the line winding position from the line releasing position. The bail 38 may not be necessarily provided (in this case, the reel becomes a bail-less type).

A turnover retaining mechanism (not shown) that turns over the supporting member 33 between the fishing line winding position and the fishing line releasing position may be provided inside one of the pair of arm portions 32. The pair of arm portions 32 may have a reinforcing member 37. The reinforcing member 37 may bridge between the pair of arm portions 32 and have an arched shape curved toward the rear side (substantially an U-shape or an curved convex shape toward the reel body 1) and extending from a lateral side of one of the pair of arm portions 32 to a lateral side of the other of the pair of arm portions 32. It is preferable that the reinforcing member 37 be arranged on both sides of the arm 32. The reinforcing members 37 provided on the both sides preferably have substantially the same shape, and extend out from the front portion (the portion provided with the supporting member 33, see FIG. 2a) of the lateral side of the arm portion 32 toward the rear side. The distance between the reinforcing member 37 on one side and the reinforcing member 37 on the other side is increased as they are situated closer to the rear side. In other words, the reinforcing members 37 are arranged in an inverted V shape (spreading toward the rear side) when they are viewed laterally in the direction in which the both arm portions 32 face to each other.

Figure 3:
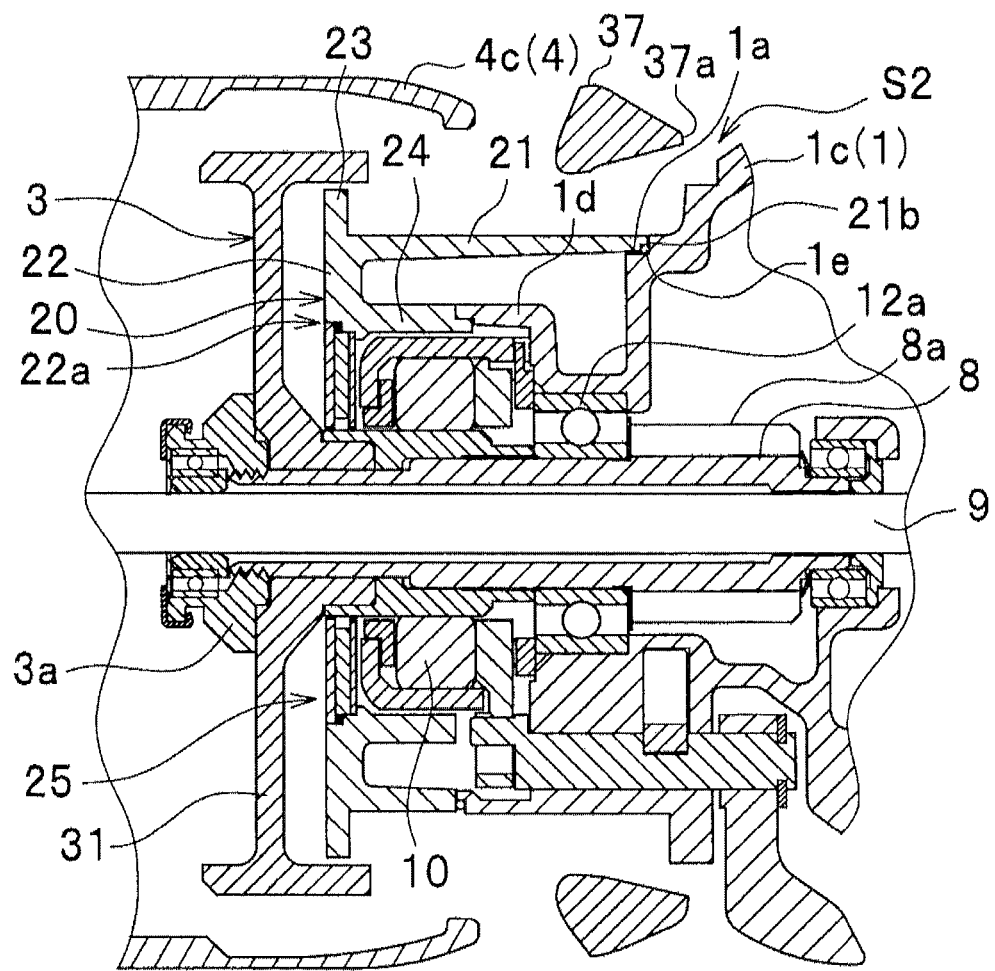
FIG. 3 is an enlarged sectional view of an essential part of the fishing spinning reel of FIG. 1.

A circumferential wall 31a of the cylinder portion 31 facing the reinforcing members 37 may be largely notched in order to reduce the weight and opening 36 may be provided in the wall. The opening 36 may be provided at an angle of substantially 90 degrees with respect to the position where the arm portions 32 are formed so as to oppose to each other. The opening 36 may have a front edge 301 and lateral edges 302, 302 continuously formed from the front edge 301. The front edge 301 may have a substantially linear shape as viewed from the lateral side and slopes down toward the connecting portion 32a. Referring to FIG. 3, the reinforcing members 37 may be disposed with a clearance S2 in order to prevent a rear edge 37a of the reinforcing member 37 from contacting with a proximal end 1c of the reel body 1 and the like, in diagonally front of the proximal end 1c. In this manner, appropriate rotation of the rotor 3 is secured.

As described above, the protection cover 20 is configured to be attached to the front portion of the reel body 1 and have a cap shape (ring-shaped cover body). Referring to FIG. 3, the protection cover 20 may include a base portion 21 and a lid portion 22 which may be formed of resin or the like integrally with each other. The protection cover 20 may be plated and disposed detachably on the front portion of the reel body 1 with a bolt 39 (see FIG. 4).

The base portion 21 may have a cylindrical shape and surround the front portion of the reel body 1 around the spool shaft 9 to protect the one-way clutch 10 and the like. An inner circumferential wall 24 may be provided in a concentric cylindrical manner on the inner side of the base portion 21. The inner circumferential wall 24 extends from an inner edge 22a of the lid portion 22 toward the rear side to surround the front portion of the one-way clutch 10. A rear edge of the inner circumferential wall 24 touches a cylinder edge 1d disposed in the front portion of the reel body 1. A rear edge 21b of the base portion 21 is jointed with a step 1a formed on a proximal end of the front portion of the reel body 1 with an seal member 1e interposed therebetween.

The lid portion 22 may have an annular shape (not shown) as viewed from the front side and a brim 23 may be formed integrally on the periphery of the lid portion 22. The brim 23 extends radially outward from the lid portion 22 to serve as a fishing line stopper. The brim 23 may be continuously formed to extend in a circumferential direction and disposed such that it does not contact with an opposing inner surface of the rotor 3 (an inner surface of the cylinder portion 31). In this manner, the brim 23 forms a wall to stop a fishing line L entering inside, which will be hereunder described.

Figure 4:
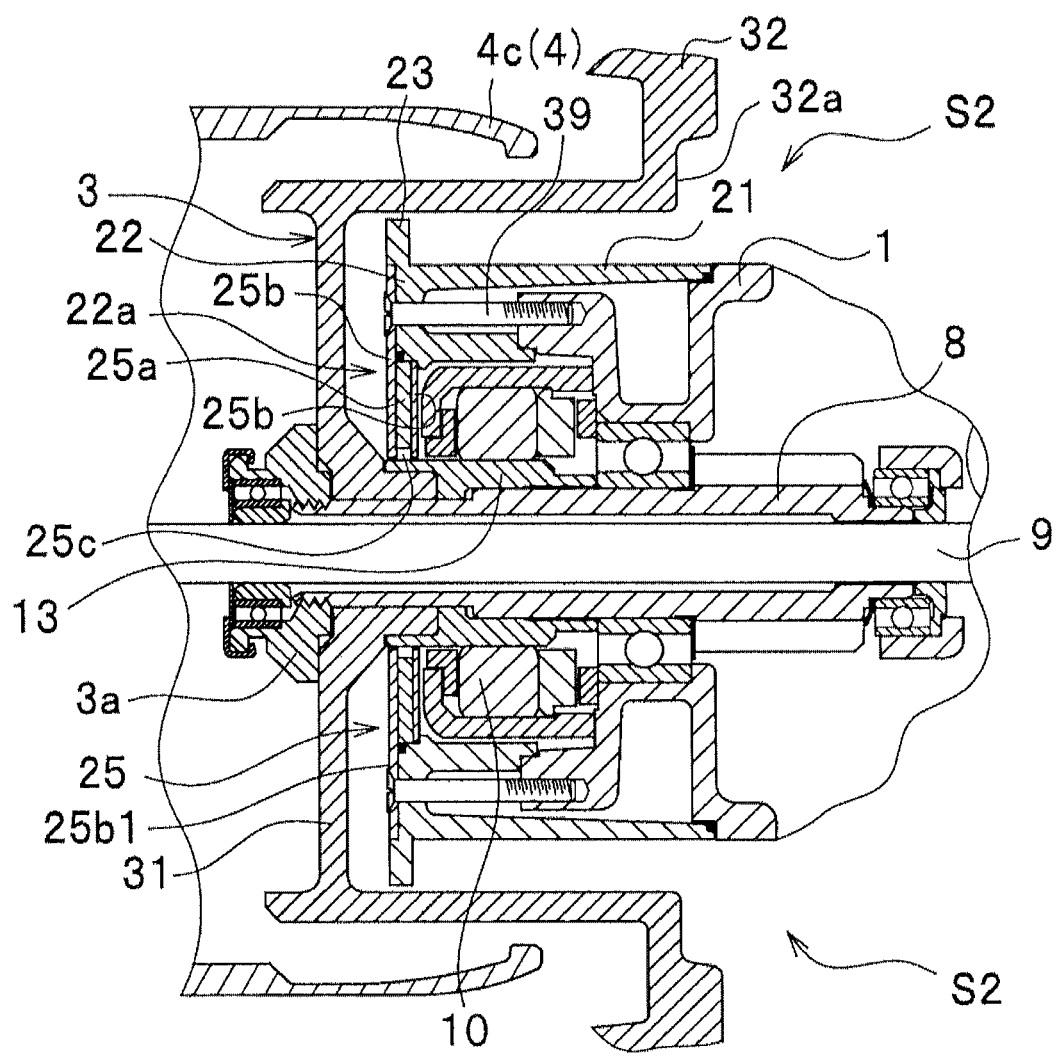
FIG. 4 is an enlarged sectional view along the plane including a bolt of a magnetic seal mechanism in relation to FIG. 3.

A magnetic seal mechanism 25 may be provided on the inner edge 22a of the lid portion 22 to seal an opening surrounded by the inner edge 22a. Referring to FIG. 4, the magnetic seal mechanism 25 may include a magnet 25a, a retainer (magnetic ring) 25b, an inner ring 13, and a magnetic fluid 25c. These components may be formed as a single unit. The magnet 25a may have an annular shape and be disposed to surround the rotational shaft sleeve 8 with a prescribed clearance therebetween. The retainer 25b is a component to support the magnet 25a from its front and rear sides and has an annular shape. The inner ring 13 is a cylindrical-shaped magnetic body that forms a part of the one-way clutch 10. The inner ring is unrotatably fitted onto the rotational shaft sleeve 8 and fitted in the one-way clutch 10 to form a magnetic circuit with the magnet 25a. The magnetic fluid 25c may be prepared by dispersing magnetic fine particles such as $Fe_3O_4$ into a surfactant and a base oil so as to have viscosity and react with a magnet brought close. Accordingly, the magnetic fluid 25c is stably maintained within a concave portion 25e and within a gap around the magnet 25a by the magnetic circuit formed by the magnet 25a, the support member 25b, and the inner ring 13 working as a magnetic body, and thereby sealing the opening surrounded by the inner edge 22a.

Referring to FIG. 4, the retainer 25b disposed on the front side may have an extended portion 25b1 that extends out in the radial direction and the magnetic seal mechanism 25 is fixed on the inner edge 22a of the lid portion 22 through the bolt 39 inserted through the extended portion 25b1. The bolt 39 is screwed into the cylinder edge 1d of the reel body 1 and thereby the protection cover 20 is attached to the front portion of the reel body 1.

Figure 5:
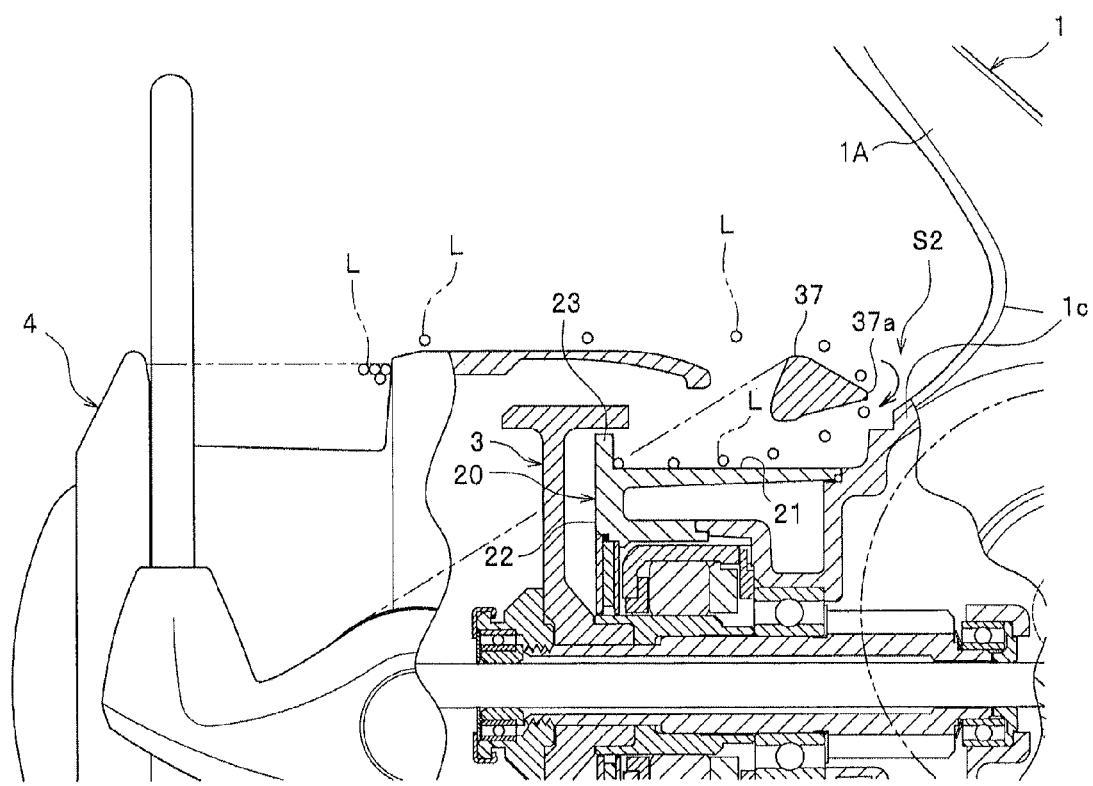
FIG. 5 is an explanatory drawing for describing a situation where a fishing line is entering between a protection cover and a rotor.

Referring next to FIG. 5, behavior of the fishing line L when the fishing line L enters between the front portion of the reel body 1 and the rotor 3 will be now described. During releasing or winding operation of the fishing line L, the winding of the fishing line L could loosen and be disengaged, or a winding position of the fishing line L could be shifted backward due to line slack caused by tension changes and effects of wind as illustrated in FIG. 5. For example, when the fishing line L reaches (enters) to the protection cover 20 from the clearance S2 between the rear edge 37a of the reinforcing member 37 of the rotor 3 and the front portion 1 (the proximal end 1c) of the reel body 1, the fishing line L may wrap around the base portion 21 of the protection cover 20.

The fishing line L wrapped around the base portion 21 may move from the rear side to the front side of the base portion 21 along the outer peripheral surface of the base portion 21 due to the tension generated by the winding (or releasing) of the fishing line L. The fishing line L may then move closer and touches to the brim 23 provided on the front portion of the protection cover 20 and the fishing line L may be eventually stopped by the brim 23. Here, the brim 23 is provided on the front portion of the protection cover 20 and made as a wall situated within a relatively small space around the front portion of the protection cover 20 inside the rotor 3. Therefore, the fishing line L moving along the protection cover 20 is securely stopped by the brim 23. The brim 23 can prevent the fishing line L from moving further than the brim 23 toward the front side and the fishing line is retained on the protection cover 20.

In this manner, it is possible to prevent the fishing line L from biting or entangling in components disposed inside the rotor 3.

According to the fishing spinning reel described in the above embodiment, the brim 23 can lock the fishing line L on the protection cover 20 and therefore it is possible to prevent the fishing line L from moving further than the brim 23 toward the front side. Consequently, it is possible to prevent the fishing line L from biting or entangling in components disposed inside the rotor 3, such as the magnetic seal mechanism 25. In this manner, a fishing spinning reel with a fine fishing operability can be obtained.

Moreover, since the brim 23 is provided on the front portion of the protection cover 20, it is possible to securely prevent the fishing line L from moving further forward than the brim 23. In this manner, it is possible to prevent the fishing line L from biting or entangling in components disposed inside the rotor 3, such as the magnetic seal mechanism 25.

The brim 23 may be formed to extend to the rear side at an angle and moreover may be formed to have a sectionally L-shape (a tip portion of the brim 23 is bent toward the rear side) to allow the fishing line L to be locked easily. Alternatively the brim 23 may be formed separately and then attached to the lid portion 22.

Second Embodiment

Figure 6A:
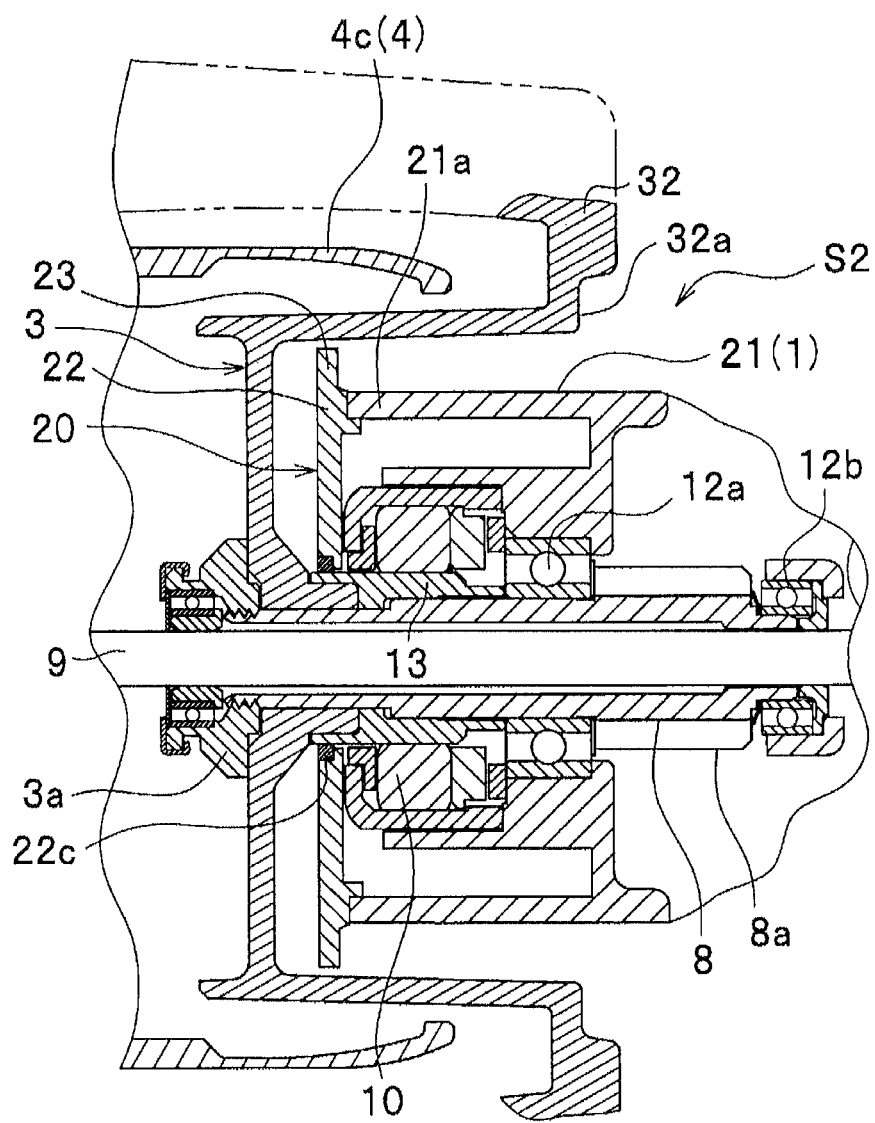
FIG. 6a is an enlarged sectional view of an essential part of a fishing spinning reel according to a second embodiment of the disclosure.
Figure 6B:
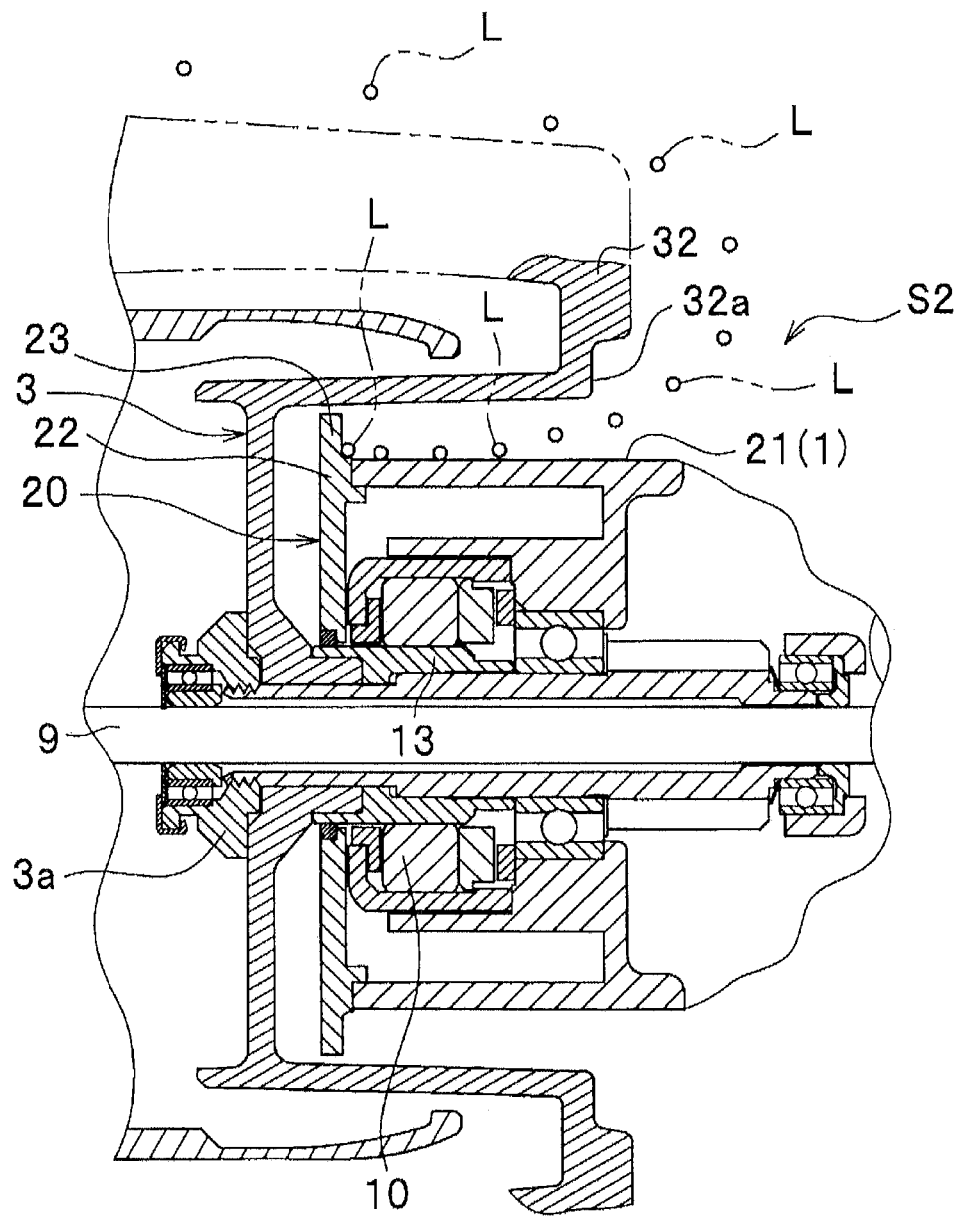
FIG. 6b is an explanatory drawing for describing a situation where a fishing line is entering between a protection cover and a rotor.

Next, a second embodiment of the fishing spinning reel will now be described with reference to FIG. 6. FIGS. 6a and 6b illustrate the clearance S2 formed between the arm portion 32 and the base portion 21 of the protection cover 20. FIG. 6b further illustrates an example of the fishing line L entering from the clearance S2. Difference between the first embodiment and the second embodiment is that the base portion 21 of the protection cover 20 is integrally formed with the reel body 1.

The lid portion 22 may be separately formed from the reel body 1 and have a circular disk shape. The lid portion 22 may be attached to an end portion 21a of the base portion 21 and serves as the protection cover 20 together with the base portion 21. An outer diameter of the lid portion 22 is made larger than the outer diameter of the end portion 21a of the base portion 21 and the outer periphery of the lid portion 22 projects in the radial direction when the lid portion 22 is attached to the end portion 21a of the base portion 21. In this embodiment, this projecting portion forms the brim 23. Attachment of the lid portion 22 may be performed by fastening with a bolt (not shown) or using an engagement structure (not shown).

A seal member 22c may be disposed on the inner edge of the lid portion 22 between the inner ring 13 and the lid portion 22. Although the protection cover 20 does not have the magnetic seal mechanism 25 in this embodiment, it may have the same.

Referring to FIG. 6b, just like the previous embodiment, when the fishing line L enters through the clearance S2 between the arm portion 32 and the base portion 21 of the protection cover 20, the brim 23 according to the present embodiment can also lock the fishing line L within a relatively small space around the front portion of the protection cover 20 inside the rotor 3. Therefore, the brim 23 prevents the fishing line L from moving further than the brim 23 toward the front side.

The fishing spinning reel according to the second embodiment can have the same advantageous effects as those of the first embodiment described above. Moreover, since the lid portion 22 is attached to the base portion 21 (the reel body 1), the brim 23 can be easily provided on the protection cover 20 so that it is possible to improve the productivity. Furthermore, since the base portion 21 is integrally formed with the reel body 1, it is possible to reduce the cost and enhance the productivity.

Third Embodiment

Figure 7A:
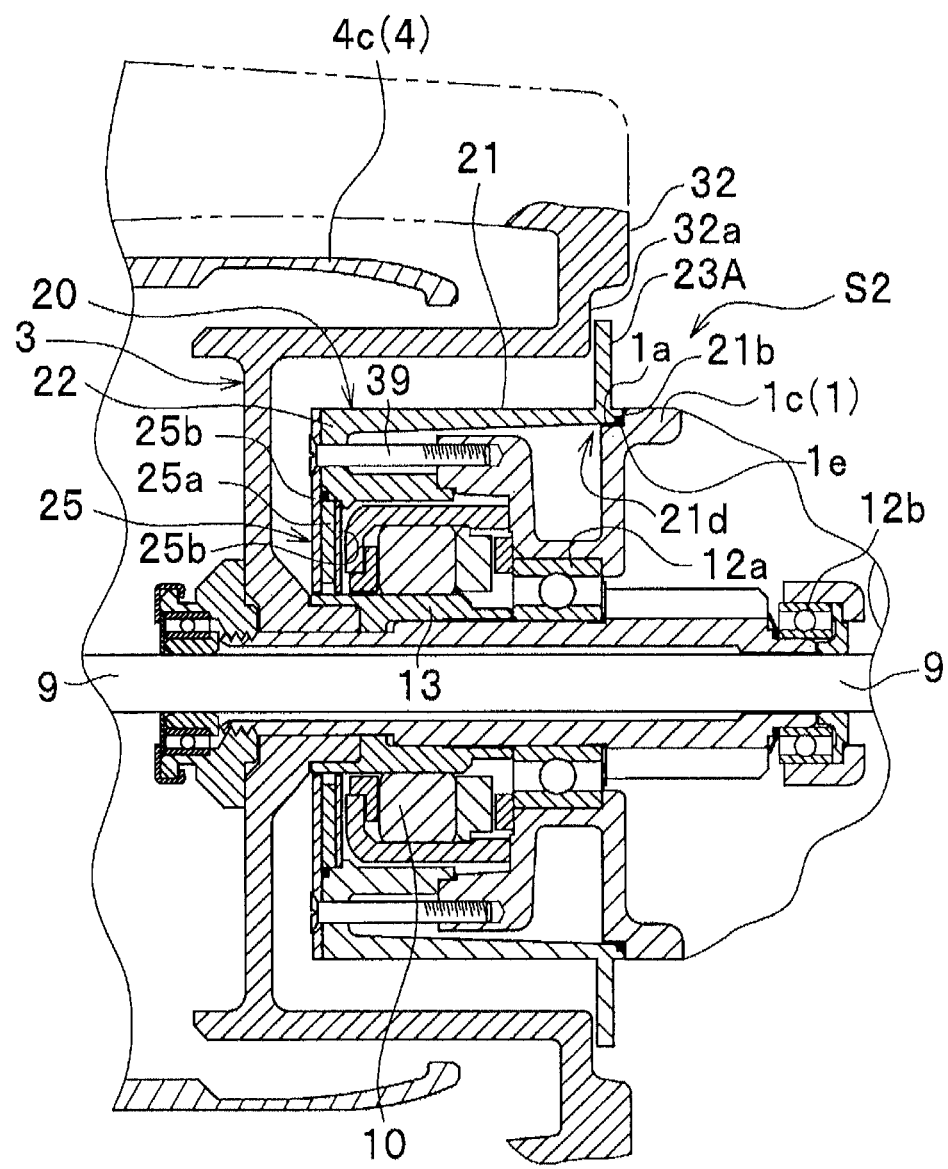
FIG. 7a is an enlarged sectional view of an essential part corresponding to FIG. 4 of a fishing spinning reel according to a third embodiment of the disclosure.

Next, a third embodiment of the fishing spinning reel will now be described with reference to FIG. 7. In FIGS. 7a and 7b, an opening formed between the arm portion 32 and the proximal end 1c of the reel body 1 is illustrated as an entrance for the fishing line L to entering inside. Difference between the third embodiment and the first and second embodiments is that a brim 23A is integrally formed with a rear portion (rear end) 21d of the base portion 21 of the protection cover 20.

The brim 23A may extend radially outward from the rear portion 21d of the base portion 21 and be continuously formed to extend in a circumferential direction to serve as a fishing line stopper. An outer periphery of the brim 23A faces the connecting portion 32a of the arm portion 32 of the rotor 3 and does not contact an inner surface of the connecting portion 32a. In this manner, the brim 23A is situated at a position where the brim 23A substantially closes the opening (entrance through which the fishing line L enters inside) formed between the arm portion 32 and the proximal end 1c of the reel body 1, and serves as a wall on which the fishing line L is locked.

Figure 7B:
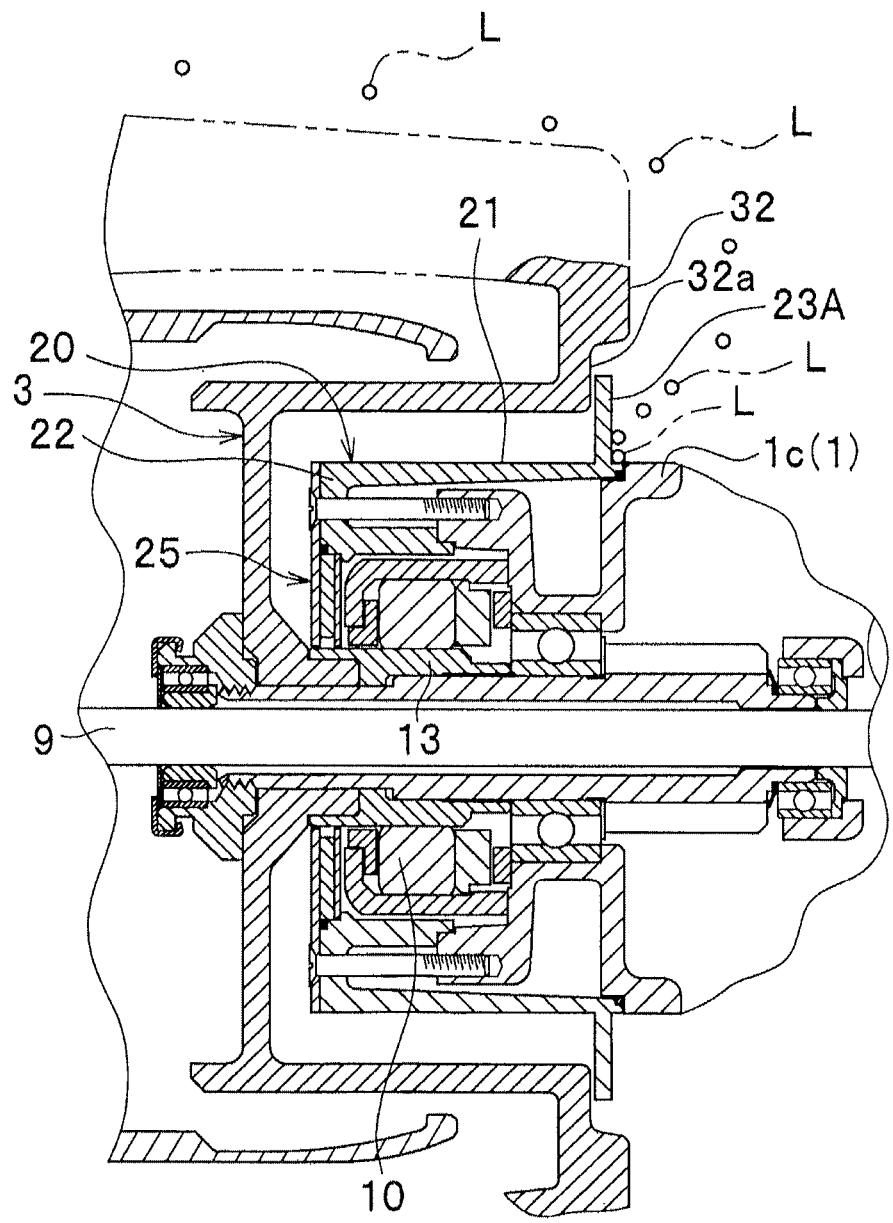
FIG. 7b is an explanatory drawing for describing a situation where a fishing line is entering between a protection cover and a rotor.

According to the embodiment, even when the fishing line L tries to enter between the arm portion 32 and the proximal end 1c of the reel body 1, the fishing line L is stopped by the brim 23A as illustrated in FIG. 7b, and it is possible to adequately prevent the fishing line L from entering inside the rotor 3.

The fishing spinning reel according to the third embodiment, by the brim 23A, the fishing line L is stopped around the entrance of the opening between the rotor 3 and the proximal end 1c of the reel body 1. Therefore, the fishing line L will not enter inside the rotor through the opening and it is possible to prevent the fishing line L from biting or entangling in components disposed inside the rotor 3. Moreover, since the fishing line L is stopped near the entrance of the opening, the fishing line L stopped thereon can be easily disengaged.

The brim 23A may be alternatively disposed more front side with respect to the entrance of the opening between the proximal end 1c of the reel body 1 and the rotor 3 (at a position entering deeper into the opening rather than the entrance). Moreover, the outer periphery of the brim 23A may be disposed so as to oppose the arm portion 32 of the rotor 3.

Furthermore, the brim 23, 23A is disposed at the front or rear end in the above-described embodiments. However the brim 23, 23A may be disposed at any position in the front-rear direction on the base portion 21.

What is claimed is:
1. A fishing spinning reel comprising:
  a reel body;
  a rotor rotated in accordance with a rotational operation of a handle provided on the reel body;
  a spool attached to the reel body through a spool shaft and around which a fishing line is wound through a line guide provided on an arm portion of the rotor;
  a cylindrical protection cover disposed on a front portion of the reel body inside the rotor to house components disposed inside the rotor, the protection cover including a base portion and a lid portion attached on a front end of the base portion; and
  a fishing line stopper protruding out from an outer periphery of the lid portion of the protection cover in a radial direction, the stopper being arranged circumferentially around the lid portion,
  wherein the lid portion has an opening through which a cylindrical member is inserted, the cylindrical member housing the spool shaft, and
  wherein the opening is sealed with a seal mechanism.

2. The fishing spinning reel of claim 1, wherein the fishing line stopper is provided on a front portion of the protection cover.

3. The fishing spinning reel of claim 1, wherein the rotor has an opening, and the fishing line stopper is disposed on the lid portion in front of a front edge of the opening of the rotor.

4. The fishing spinning reel of claim 3, wherein the base portion is integrally formed with the reel body.

5. The fishing spinning reel of claim 3, wherein the fishing line stopper is formed on the outer periphery of the lid portion so as to face an inner peripheral surface of the rotor.

6. The fishing spinning reel of claim 1, wherein the fishing line stopper is provided on a rear portion of the protection cover.

7. The fishing spinning reel of claim 1, wherein the lid portion is detachably provided on the reel body.

8. The fishing spinning reel of claim 1, wherein the fishing line stopper comprises a flange arranged circumferentially around the lid portion.

9. The fishing spinning reel of claim 1, wherein the fishing line stopper is a flange extending circumferentially around the lid portion.

10. The fishing spinning reel of claim 1, wherein the protection cover is disposed on the reel body using a bolt separate and distinct from the fishing line stopper.

* * * * *